United States Patent [19]

Bando et al.

[11] Patent Number: 4,592,887
[45] Date of Patent: Jun. 3, 1986

[54] METHOD OF PRODUCING SHAPED RESINOUS ARTICLES

[75] Inventors: Satoshi Bando, Kurashiki; Hirokuni Tanii, Nara; Yoshio Ohfuji, Kyoto, all of Japan

[73] Assignee: Kuraray Co., Ltd., Kurashiki, Japan

[21] Appl. No.: 368,223

[22] Filed: Apr. 14, 1982

[30] Foreign Application Priority Data

Apr. 30, 1981 [JP] Japan ................................. 56-66368

[51] Int. Cl.$^4$ ............................................. B29C 33/40
[52] U.S. Cl. ................................... 264/337; 249/115; 249/134; 264/338
[58] Field of Search ................ 264/337, 338; 249/134, 249/114 R, 115; 525/60

[56] References Cited

U.S. PATENT DOCUMENTS

| | | | |
|---|---|---|---|
| 2,399,653 | 5/1946 | Roland | 525/60 |
| 3,737,266 | 6/1973 | Yamamoto | 249/134 |

FOREIGN PATENT DOCUMENTS

| | | | |
|---|---|---|---|
| 1203448 | 10/1965 | Fed. Rep. of Germany | 249/134 |
| 47-48489 | 6/1972 | Japan | 525/60 |
| 716033 | 9/1954 | United Kingdom | 264/337 |

OTHER PUBLICATIONS

Bishop, R. B., Mold Release, in SPE Journal, May 1969, vol. 25, pp. 51–53.

*Primary Examiner*—James Derrington
*Attorney, Agent, or Firm*—Kramer and Brufsky

[57] ABSTRACT

Liquid curable resins, such as unsaturated polyester resins, unsaturated epoxy resins, polymethyl methacrylates, are cured in a mold, the casting surface of which, is made of a vinyl alcohol-olefin copolymer to produce a shaped resinous article with an improved and even surface gloss.

15 Claims, No Drawings

METHOD OF PRODUCING SHAPED RESINOUS ARTICLES

BACKGROUND OF THE INVENTION

This invention relates to a method of producing a shaped article from a liquid curable resin, and to a mold therefor.

1. Description of the Prior Art

The compressive strength, tensile strength and other properties of shaped articles molded from liquid curable resins can be improved by incorporating fillers, reinforcing agents and the like in the molding composition. Moreover, such filled and/or reinforced resin articles are highly resistant to acids and other chemicals. It is for these reasons that such articles have found application in a variety of fields. However, in the production of such shaped articles from a liquid curable resin, the conventional molds made of metal, rubber, wood or FRP present problems upon ejection of the article from the mold so that heretofore, it has been difficult to produce a shaped article having a satisfactory and even surface gloss in one operation. For overcoming the above disadvantages, it has, for instance, previously been proposed to apply a mold release agent such as wax, polyvinyl alcohol, a silicone or fluorocarbon resin or the like to the casting surface of the mold or to employ a mold made of silicone rubber with or without application of a mold release agent. However, since none of the prior art methods insures satisfactory release of the article, the article cannot be easily taken out from the mold. Moreover, in the event that the article is partially released in an early stage of the curing process, it assumes an uneven surface gloss. It has thus been difficult to obtain a shaped resin article with a satisfactory even surface gloss.

Therefore, it heretofore has been necessary, in order to obtain a shaped article having a satisfactory even gloss, to buff or coat the surface of the molded articles or apply a gel coating which contains little or no filler to the surface of the mold. However, these methods not only add to the production cost of the articles but when coating or gel coating is employed, the resin layer on the surface of the article detracts from the surface hardness and strength of the article.

SUMMARY OF THE INVENTION

A detailed analysis of the above-mentioned disadvantages of the molding of liquid curable resins has shown that the surface gloss characteristics of such molded articles depend largely on the relationship between the resin and the casting surface of the mold. It is necessary that the casting surface of the mold and the resin be in intimate, unseparable contact throughout the curing reaction and be easily separable after completion of the curing reaction.

The liquid curable resin generally features a large dimensional change, i.e. shrinkage or expansion, in the course of the curing reaction. Accordingly, it is necessary that the resin and the casting surface of the mold be in close contact throughout the curing reaction. However, in removing the article from the mold at the end of the molding proccss, if the degree of this contact is too high, the article cannot easily be released from the mold and, if it be released with force, the surface of the article can be damaged. Therefore, it has been necessary to develop a mold having a casting surface that would satisfy the two conflicting requirements:

(i) a highly intimate contact throughout the molding process; and
(ii) a satisfactory releasability at the time of ejection.

It has now been found that use of a mold having a coating surface comprising a vinyl alcohol-olefin copolymer satisfies both of the above-mentioned conflicting requirements. Accordingly, the present invention is directed to a method of producing shaped articles from a liquid curable resin by curing in a mold which contains a casting surface made of a vinyl alcohol-olefin copolymer. The present invention thereby provides a shaped resin article having an improved, even surface gloss.

DETAILED DESCRIPTION OF THE INVENTION

The vinyl alcohol-olefin copolymers used in accordance with the present invention contain from about 40 to 90 mole percent and preferably, from about 50 to 80 mole percent of the vinyl alcohol co-monomer. This defined quantitative range of vinyl alcohol is desirable for ensuring satisfactory degrees of intimacy of contact and releasability. If the vinyl alcohol component exceeds 90 mole percent, the releasability will be excessive, i.e., the molded article tends to be locally detached from the mold in an early stage of curing and also tends to give rise to an uneven gloss; whcrcas, a vinyl alcohol content less than 40 mole percent would not ensure a satisfactory releasability, making it difficult to eject the article from the mold. The olefins component of said copolymer can be derived from any olefin containing from 2 to about 6 carbon atoms, e.g., ethylene, propylene, butylene, and the like, although ethylene is most desirable. Moreover, said copolymer can further contain small amounts of other suitable comonomers such as acrylic acid esters, methacrylic acid esters, and the like.

In accordance with the present invention, the mold should have a casting surface made from a vinyl alcohol-olefin copolymer. The mold need not be made, in its entirety, of such a copolymer but may be a laminated construction of the copolymer with another material. A mold of the type required can be fabricated by any of the following alternative methods: (i) the copolymer can be molded into a mold by injection molding, extrusion molding, press molding or the like; (ii) a sheet of the copolymer can be molded into a mold by vacuum molding, compression molding or the like; (iii) a laminated sheet made up of the above copolymer as one lamina with the remaining laminae selected from other thermoplastic polymers (e.g. polyvinyl chloride, polyethylene, polypropylene, polyamide, polyester, and the like) can be molded into a mold by vacuum molding, compression molding or the like; and (iv) a mold or pattern of metal, wood, synthetic resin (e.g. polyvinyl chloride, polyethylene, polypropylene, polyamide, polyester, unsaturated polyester and the like) can be lined with a sheet of the copolymer or by spraying or applying a copolymer dope over the casting surface of the pattern and drying it to give a copolymer film. Among these methods, methods (ii) and (iii) are suited for the manufacture of products having intricate shapes. Method (iv) is suitable for the manufacture of comparatively large articles. The thickness of the copolymeric coating surface is preferably within the range of 15 to 1000μ. As to molding methods, vacuum molding is especially suitable.

As another feature of this invention, the water content (dry basis) of said vinyl alcohol-olefin copolymer is preferably not more than 5.5 weight precent and, for still better results, not more than 4 weight precent. This feature is important in connection with the pouring of the liquid curable resin into the mold and the ejection of the article from the mold. The above limits, however, need not necessarily hold true in the middle of the curing reaction. For example, if a small amount of water is added to the liquid curable resin as a curing co-catalyst, then, even if the water content of the copolymer before pouring is adjusted to 5.5 weight percent or less, its water content may be increased beyond the recited limits after pouring. In such cases, it is preferable that the water content of the copolymer be reduced to 5.5 weight percent or less, for example by drying the same before ejection. If the water content of the vinyl alcohol-olefin copolymer is over 5.5 weight percent, the surface gloss of the article will be reduced. While the reason for this phenomenon is not clear, it is currently believed that the water contained in the vinyl alcohol-olefin copolymer exerts a plasticizing effect on the polymer and the water inhibits the curing reaction of the resin. Moreover, the low water content is desirable for increasing the number of times the mold can be reused. A water content of not more than 4 weight percent is especially desirable in that the mold will then be as serviceable and capable of yielding as neat an article as in the first molding cycle, even after more than 10 molding cycles. The water content of the vinyl alcohol-olefin copolymer can be controlled to the above-mentioned range of not more than 5.5 weight percent and preferably not more than 4 weight percent before use of the mold by various procedures such as drying in a dry air current at room temperature, drying under heating at atmospheric pressure or in vacuo, or drying in a hot air current. In the case of drying under heating, a higher heating temperature will result in a shorter drying time but the temperature should not be so high as to cause harmful results such as deformation and degradation of the mold.

The liquid curable resin which is employed in accordance with this invention is a resin which is normally liquid before curing and is capable of curing, for example, under the influence of a curing agent or the like. Thus, for example, unsaturated polyester resins, unsaturated epoxy resins, and mixtures of vinyl monomers such as methyl methacrylate, styrene and vinyl toluene with the polymers derived from said monomers can be suitably employed. These resins may contain other monomers capable of yielding cross-linked structures. Of such resins, the most desirable are low-shrinkage resins that will not show a volume reduction of more than 3 percent on curing. As examples of such low-shrinkage resins, there can be mentioned unsaturated polyester or unsaturated epoxy resins containing thermoplastic resins such as styrene polymers, methacrylate polymers, vinyl acetate polymers, and the like. Especially desirable are such low-shrinkage resins to which a dispersing agent has been added for improving the dispersibility and stability of such thermoplastic resins. Examples of such dispersing agent are disclosed in Japanese Patent Applications Laid-open Nos. 8058/77 and 74592/78. Thus, graft or block copolymers of styrene polymers with polyester or epoxy polymers can be mentioned by way of example.

In the practice of this invention, a filler can be added to said liquid curable resin, and the advantages of this invention are best exploited when such a filler is employed. This is believed to be due to the fact that when a mold release is applied to the casting surface as has been conventionally practiced, the mold release tends to be removed from the surface of the mold by the friction between the filler and the mold at the time of pouring or curing, thus giving rise to an unsatisfactory surface gloss on the article. As examples of said filler, there can be mentioned sand, silica, powders or particles of rocks, e.g. granite, marble, and the like, pulverizates of porcelain, glass and other ceramics; spherical particles such as glass balloons, silica ballons, etc.; and talc, mica, quartz powder, calcium carbonate, barium sulfate, aluminum oxide, iron oxide, aluminum hydroxide, organic polymeric fibers, pulps, powders, and the like. These fillers are preferably used in the range of 80 to 1000 parts by weight and for still better results, in the range of 120 to 700 parts by weight to each 100 parts by weight of the liquid curable resin.

The curing reaction of the liquid curable resin is generally effected with the aid of a curing agent. The curing agent can be one of the various catalysts commonly employed for polymerization and curing of liquid curable resins. For unsaturated polyester resins, unsaturated epoxy resins, and mixtures of vinyl monomers with polymers thereof, suitable curing agents include, for example, methyl ethyl ketone peroxide, benzoyl peroxide, di-t-butyl peroxide, t-butyl perphthalate, maleic acid hemi-peresters, azobisisobutyronitrile, and the like. Such curing agents are preferably used in the proportion of 0.1 to 6 parts by weight and, for still better results, 0.5 to 4 parts by weight to each 100 parts by weight of the liquid curable resin.

In the practice of this invention, it is possible to incorporate in the molding composition such additional components as may be considered necessary or useful, for example reinforcements such as glass fiber, metal-wire netting, steel wire, steel bar, punched steel sheet, piano wire, PC steel wire, and the like; accelerators such as cobalt naphthenate, dimethyl aniline, and the like; curing regulators, pigments, colored fibers, ultraviolet absorbers, flame retardants, and the like.

The modes of practice of this invention will be described below in detail. First, the liquid curable resin is compounded, if necessary, with a filler, curing agent and other additives to prepare a molding composition. The composition is poured into a mold having a casting surface made from a vinyl alcohol-olefin copolymer (with a water content of, preferably, not more than 5.5 wt. % and, for still better results, not more than 4 wt. %). The resin composition is compacted, for example by vibration, and caused to cure in situ at room temperature or under heating, followed by ejection of the article. By using pigments and fillers in suitable combinations, shaped articles of desired colors and patterns inclusive of those resembling marble, granite, and the like can be easily produced.

In accordance with this invention, it is easy to obtain a shaped article having a satisfactory and even surface gloss without using a mold release or without forming a gel coating on the surface, or employing other finishing operations. Therefore, the method is very useful for the production of articles which must be decorative, for example, building materials (e.g. floor and wall materials including tiles), furniture and home equipment (e.g. table tops, counter tops, wash-basin tops, bath tubs, etc.)

as well as other products. Moreover, the mold can be used repeatedly because its casting surface does not easily pick up resin and, in fact, it can be reused more than ten molding cycles, thus contributing to economical production. The following examples are given to illustrate this invention in further detail and should by no means be construed as limiting its scope. In these examples, all parts are by weight.

EXAMPLE 1

A laminate consisting of a polyvinyl chloride sheet with a thickness of 500μ and a vinyl alcohol-ethylene copolymer (vinyl alcohol content: 60 mole %) sheet with a thickness of 20μ was preheated until it was softened The laminate was then molded under vacuum suction on an aluminum pattern provided with suction holes and cooled with water sprays to produce a mold measuring 300 mm long, 300 mm wide and 10 mm deep and in which, the casting surface comprised the vinyl-alcohol-ethylene copolymer lamina. This mold was dried in a dry air current to adjust the water content of the vinyl alcohol-ethylene copolymer to 2.5 weight %. A curable composition of Formula 1 indicated below was poured into the mold and compacted on a table vibrator (vibration frequency: 3600 VPM; output: 200 W) for 5 minutes, after which time it was allowed to stand at room temperature (20°–25° C.) for 24 hours. After this curing period, the shaped article was readily ejected from the mold. The shaped article thus obtained had a satisfactory and even surface gloss.

This mold was used again and again for 5 additional runs. Each of the resultant articles had a satisfactory surface gloss which has not different from the first article.

| Formula 1 | | |
|---|---|---|
| (1) | Orthophthalic-unsaturated polyester resin (unsaturated alkyd 60%) | 56 Parts |
| (2) | Styrene monomer | 24 Parts |
| (3) | Polystyrene in styrene (solids 30%) | 20 Parts |
| (4) | Dispersing agent (Kuraray, Co., Ltd., Kurapearl R-15, main component; a copolymer comprising styrene polymer as the main chain and polyester branch chains) | 2 Parts |
| (5) | Curing agent (55% methyl ethyl ketone peroxide) | 1.5 Parts |
| (6) | Accelerator (cobalt naphthenate solution, 6% Co) | 0.4 Part |
| (7) | Calcium carbonate powder | 100 Parts |
| (8) | Colored ceramic powder (grain size 0.1~3 mm) | 400 Parts |
| (9) | Pigment | 2 Parts |

EXAMPLE 2

A laminate of a polyvinyl chloride sheet with a thickness of 500μ and a vinyl alcohol-ethylene copolymer (vinyl alcohol content: 70 mole %) sheet with a thickness of 20μ was vacuum-molded on a wooden pattern to fabricate a mold in which the casting surface comprised the vinyl alcohol-ethylene copolymer. The water content of the vinyl alcohol-ethylene copolymer of the mold thus formed was adjusted to 2.5 weight %. Then, a curable resin composition of Formula 2 indicated below was poured into the above mold and treated in the same manner as Example 1 to give a floor tile-shaped article. This article could be easily ejected from the mold and had a satisfactory and even surface gloss.

| Formula 2 | | |
|---|---|---|
| (1) | Unsaturated epoxy resin (solids 60%) | 55 Parts |
| (2) | Styrene monomer | 20 Parts |
| (3) | Polystyrene in styrene (solids 30%) | 25 Parts |
| (4) | Dispersing agent (Kuraray Co., Ltd., Kurapearl S-25) | 2 Parts |
| (5) | Curing agent (55% methyl ethyl ketone peroxide) | 2 Parts |
| (6) | Accelerator (cobalt naphthenate solution, 6% Co) | 0.5 Part |
| (7) | Colored ceramic powder (grain size: 0.1~3 mm) | 430 Parts |
| (8) | Talc | 80 Parts |

EXAMPLE 3

In the same manner as Example 1, a laminate of a polyvinyl chloride sheet with a thickness of 500μ and a vinyl alcohol-ethylene copolymer (vinyl alcohol content 60 mole %) sheet with a thickness of 20μ was suction-molded to fabricate a mold measuring 300 mm long, 300 mm wide and 10 mm deep, in which the casting surface comprised the vinyl alcohol-ethylene copolymer. After cooling the mold with water sprays, water drops were wiped off with gauze. The water content of the vinyl alcohol-ethylene copolymer in this mold was 6.3 weight %. Without drying the mold, a curable composition of Formula 1 was poured into the mold and treated exactly in the same manner as Example 1. The resultant article had a surface gloss generally slightly inferior to that of the article produced in Example 1.

EXAMPLE FOR COMPARISON 1

An aluminum pattern measuring 300 mm long, 300 mm wide and 10 mm deep was lined with a polyvinyl alcohol sheet with a thickness of 50μ and the polyvinyl alcohol sheet lining was dried in a hot current of air to adjust its moisture content to 3.0 weight %. A curable resin composition of Formula 1 was then molded in the above mold in the same manner as Example 1. The resultant article was locally released from the mold spontaneously in a stage of incomplete curing. After 24 hours of curing, the parts of the article which had been in intimate contact with the mold could be released neatly and easily. However, the surface gloss of the ejected article was generally less satisfactory than the article according to Example 1 and the surfaces which had been spontaneously prematurely released at the stage of incomplete curing were found to lack gloss and be uneven in appearance.

EXAMPLE 4

An aluminum mold measuring 200 mm long, 200 mm wide and 20 mm deep was lined with a vinyl alcohol-ethylene copolymer (vinyl alcohol content: 70 mole %) sheet with a thickness of 20μ. The resulting mold was preheated in dry air at 40° C. to adjust the water content of the vinyl alcohol-ethylene copolymer to 1.5 weight %. A curable resin composition of Formula 3 given below was poured into the mold and cured at 40° C. for 6 hours and, then, at 80° C. for 2 hours. The article was ejected from the mold. The water content of the vinyl alcohol ethylene copolymer at ejection was 2.5 weight %. The ejection of the article was smooth and the article had a satisfactory and even gloss all over its surface.

| Formula 3 | | |
|---|---|---|
| (1) | Polymethyl methacrylate syrup (30% homopolymer/70% monomer) | 100 Parts |
| (2) | Aluminum hydroxide powder | 150 Parts |
| (3) | Colored ceramic powder (grain size 0.5 to 3 mm) | 80 Parts |
| (4) | Curing agent (t-butyl peroxymaleate) | 2 Parts |
| (5) | Calcium hydroxide | 0.8 Part |
| (6) | Water | 0.25 Part |
| (7) | Ethylene glycol dimercaptoacetate | 0.25 Part |

EXAMPLE 5

A dry wooden pattern is provided with an enclosure having a packing space to the surface of which is affixed a 25μ-thick vinyl alcohol-ethylene copolymer (vinyl alcohol content 70 mole%) sheet dried to a water content of 1.5 weight percent and measuring 200 mm long, 200 mm wide and 7 mm deep. The curable resin composition of Formula 4 indicated below was filled into the packing space and compacted on a table vibrator (3600 VPM and an output of 200 W) for 5 minutes, after which it was allowed to stand at room temperature (15°–20° C.) for 24 hours. After this curing period, the enclosure was removed and the article was taken out. The releasability of the molded surface held in contact with the vinyl alcohol-ethylene copolymer sheet was satisfactory and the shaped article had a very good and even surface gloss which imparted a granite stone-like appearance to the article.

| Formula 4 | | |
|---|---|---|
| (1) | Polymethyl methacrylate syrup (30% homopolymer/70% monomer, N,N—dimethylaniline 0.3%) | 100 Parts |
| (2) | Benzoyl peroxide | 0.7 Part |
| (3) | Black ceramic powder (grain size 0.1~3 mm) | 80 Parts |
| (4) | White ceramic powder (grain size 0.1~3 mm) | 240 Parts |
| (5) | Finely divided silica (grain size 0.1 mm or less) | 80 Parts |

EXAMPLE FOR COMPARISON 2

Using the curable resin composition of Formula 4, the procedure of Example 5 was repeated except that a polyvinyl alcohol sheet with a thickness of 50μ was used in lieu of the vinyl alcohol-ethylene copolymer sheet to produce a shaped article. The releasability of the molded surface held in contact with the polyvinyl alcohol sheet was satisfactory but the marginal surface area of the article exhibited poor gloss, thus presenting an uneven appearance.

EXAMPLE 6

The procedure of Example 1 was repeated except that a curable resin composition of Formula 5 below was used in lieu of the composition of Formula 1. The releasability of the resultant shaped article was satisfactory and the article had a satisfactory and even surface gloss, presenting a polished marble-like appearance.

| Formula 5 | | |
|---|---|---|
| (1) | Polymethyl methacrylate syrup (30% homopolymer/70% monomer, N,N—dimethylaniline 0.3%) | 100 Parts |
| (2) | Benzoyl peroxide | 0.8 Part |
| (3) | Aluminum hydroxide powder | 170 Parts |

EXAMPLE 7

A laminate of a polyvinyl chloride sheet with a thickness of 350μ and a vinyl alcohol-ethylene copolymer (vinyl alcohol content 60 mole %) sheet with a thickness of 20μ was affixed to a wooden pattern measuring 600 mm long, 1200 mm wide and 20 mm deep and having rounded corners in such fashion that the vinyl alcohol-ethylene copolymer comprised the coating surface thereof. A punched steel plate with a thickness of 0.6 mm was disposed in the center of the pattern. The composition of Formula 1 was poured in the same manner as Example 1 to obtain a shaped article. This article had a satisfactory and even surface gloss.

What is claimed is:

1. A method for producing a shaped resinous article exhibiting even surface gloss comprising pouring a liquid curable resin into a mold having a coating surface comprising a vinyl alcohol-olefin copolymer containing 40 to 90 mole percent of vinyl alcohol, curing said resin therein and removing the resulting shaped resinous article.

2. A method of producing a shaped resinous article as defined in claim 1 wherein said liquid curable resin contains a filler.

3. A method of producing a shaped resinous article as defined in claim 2 wherein said filler is used in a proportion of 80 to 1000 parts by weight based on 100 parts by weight of the liquid curable resin.

4. A method of producing a shaped resinous article as defined in claim 1 wherein said liquid curable resin is selected from the group consisting of unsaturated polyester resins, unsaturated epoxy resins, and mixtures of vinyl monomers with polymers thereof.

5. A method of producing a shaped resinous article as claimed in claim 1 wherein said liquid curable resin is a low-shrinkage resin having a cure volume reduction rate of not more than 3 percent.

6. A method of producing a shaped resinous article as claimed in claim 1 wherein said liquid curable resin is an unsaturated polyester resin containing a thermoplastic resin.

7. A method of producing a shaped resinous article as claimed in claim 1 wherein said liquid curable resin is an unsaturated epoxy resin containing a thermoplastic resin.

8. A method of producing a shaped resinous article as claimed in claims 6 or 7 wherein said thermoplastic resin is a polymer selected from the group consisting of styrene polymers, methacrylate polymers, saturated polyester polymers and vinyl acetate polymers.

9. A method of producing a shaped resinous article as defined in claim 1 wherein said liquid curable resin is an unsaturated polyester or unsaturated epoxy resin containing a thermoplastic resin and a dispersing agent therefor.

10. A method of producing a shaped resinous article as defined in claim 1 wherein said liquid curable resin is a mixture of methyl methacrylate and polymethyl methacrylate.

11. A method of producing a shaped resinous article as defined in claims 1, 2, 3, 4, 5, 6, 7, 9 or 10 wherein said vinyl alcohol-olefin copolymer is a vinyl alcohol-ethylene copolymer.

12. A method of producing a shaped resinous article as defined in claims 1, 2, 3, 4, 5, 6, 9 or 10 wherein said mold comprises a laminate of a plurality of polymers with its casting surface comprising a vinyl alcohol-olefin copolymer.

13. A method of producing a shaped resinous article as defined in claims 1, 2, 3, 4, 5, 6, 7, 9 or 10 wherein said mold is a mold made entirely of a vinyl alcohol-olefin copolymer.

14. A method of producing a shaped resinous article as defined in claims 1, 2, 3, 4, 5, 6, 7, 8, 9 or 10 wherein said vinyl alcohol-olefin copolymer has a water content of not more than 5.5 weight percent.

15. A method of producing a shaped resinous article as defined in claims 1, 2, 3, 4, 5, 6, 7, 8, 9 or 10 wherein said vinyl alcohol-olefin copolymer has a water content of not more than 4 weight percent.

* * * * *